(12) United States Patent
Haire

(10) Patent No.: US 7,740,257 B2
(45) Date of Patent: Jun. 22, 2010

(54) VEHICLE SUSPENSION WITH LINKED AIR BAGS

(75) Inventor: William Arthur Haire, Wodonga (AU)

(73) Assignee: Angela Kate Haire, Wodonga, Victoria (AU)

( * ) Notice: Subject to any disclaimer, the term of this patent is extended or adjusted under 35 U.S.C. 154(b) by 10 days.

(21) Appl. No.: 11/237,050

(22) Filed: Sep. 27, 2005

(65) Prior Publication Data

US 2006/0066070 A1    Mar. 30, 2006

Related U.S. Application Data

(63) Continuation-in-part of application No. 10/409,001, filed on Apr. 8, 2003, now abandoned, which is a continuation-in-part of application No. 09/744,529, filed as application No. PCT/AU99/00605 on Jul. 29, 1999, now abandoned.

(30) Foreign Application Priority Data

| Jul. 29, 1998 | (AU) | ......................................  PP4916 |
| Aug. 25, 1998 | (AU) | ......................................  PP5450 |
| Mar. 9, 1999 | (AU) | ......................................  PP9076 |

(51) Int. Cl.
*B60G 11/26* (2006.01)
*B60G 5/00* (2006.01)

(52) U.S. Cl. ............... 280/124.16; 280/683; 280/6.157; 280/124.157

(58) Field of Classification Search ................ 280/6.15, 280/6.154, 6.156, 6.157, 6.159, 678, 683, 280/124.106, 124.159, 124.16, 124.161
See application file for complete search history.

(56) References Cited

U.S. PATENT DOCUMENTS

| 2,848,248 | A | 8/1958 | Hansen et al. |
| 2,903,272 | A | 9/1959 | Bordenkircher et al. |
| 2,998,261 | A | 8/1961 | Bartlett |
| 3,050,316 | A | 8/1962 | Behles |
| 3,063,732 | A | 11/1962 | Harbers et al. |
| 3,140,880 | A | 7/1964 | Masser |
| 3,147,024 | A | 9/1964 | Brockman |

(Continued)

FOREIGN PATENT DOCUMENTS

AU    567664    10/1982

(Continued)

*Primary Examiner*—Paul N. Dickson
*Assistant Examiner*—George D. Spisich
(74) *Attorney, Agent, or Firm*—Merchant & Gould P.C.

(57) ABSTRACT

An air suspension system for a multi-axle vehicle has an air bag system including at least one air bag operatively associated with the vehicle wheels on selected wheel and axle sets to control relative movement between each of the selected wheels and a supporting frame structure of the vehicle. The system has an air-flow control arrangement to control the flow of air into each air bag to thereby control the relative movement of the wheels and vehicle frame structure. A pressurizing arrangement is provided to maintain a selected, predetermined pressure in the air bag system when the vehicle is at rest to thereby maintain a desired vehicle height. The pressurizing arrangement includes a valve to admit pressurized air to or exhaust air from the air bag system to maintain the predetermined vehicle height. The valve is actuated by a link associated with a rocker member connected to spaced axles of the vehicle.

8 Claims, 7 Drawing Sheets

U.S. PATENT DOCUMENTS

| | | | |
|---|---|---|---|
| 3,197,231 A | 7/1965 | Holzman | |
| 3,201,141 A | 8/1965 | Bernstein et al. | |
| 3,315,979 A | 4/1967 | Chalmers | |
| 3,499,662 A | 3/1970 | Paul | |
| 3,649,043 A * | 3/1972 | Higginbotham et al. | 280/6.158 |
| 3,782,753 A | 1/1974 | Sweet et al. | |
| 4,335,901 A * | 6/1982 | Gladish | 280/6.151 |
| 4,570,972 A * | 2/1986 | Pangos | 137/493.2 |
| 4,614,247 A * | 9/1986 | Sullivan | 180/24.02 |
| 4,736,958 A | 4/1988 | Armstrong | |
| 4,856,812 A | 8/1989 | Stephens et al. | |
| 5,046,752 A | 9/1991 | Stephens et al. | |
| 5,228,718 A | 7/1993 | Kooistra | |
| 5,374,077 A | 12/1994 | Penzotti et al. | |
| 5,651,555 A * | 7/1997 | O'Reilly et al. | 280/6.158 |
| 5,662,357 A * | 9/1997 | Ryu | 280/6.159 |
| 5,845,723 A | 12/1998 | Hirahara et al. | |
| 5,873,581 A | 2/1999 | Yale | |
| 6,149,142 A | 11/2000 | Penzotti | |
| 6,203,026 B1 * | 3/2001 | Jones | 280/6.151 |
| 6,276,710 B1 * | 8/2001 | Sutton | 280/678 |
| 6,783,138 B2 * | 8/2004 | Reiner et al. | 280/124.16 |

FOREIGN PATENT DOCUMENTS

| | | |
|---|---|---|
| AU | 69220/87 | 2/1986 |
| JP | 58-128913 | 8/1983 |
| JP | 62-141505 | 9/1987 |
| JP | 7-27205 | 1/1995 |
| JP | 8142631 A | 6/1996 |
| JP | 8-207532 | 8/1996 |
| SU | 1043041 A | 8/1978 |

* cited by examiner

VEHICLE SUSPENSION WITH LINKED AIR BAGS

This application is a Continuation-in-Part of U.S. patent application Ser. No. 10/409,001 filed on Apr. 8, 2003, which is a Continuation-in-Part of U.S. patent application Ser. No. 09/744,529 filed on Jan. 25, 2001, which is the National Stage of Application No. PCT/AU99/00605 filed on Jul. 29, 1999, which claims priority to Australian Application No. PP 4916 filed on Jul. 29, 1998, Australian Application No. PP 5450 filed on Aug. 25, 1998 and Australian Application No. PP 9076 filed on Mar. 9, 1999, and which application(s) are incorporated herein by reference.

FIELD OF THE INVENTION

This invention relates to a vehicle suspension incorporating linked air bags and relates particularly to a suspension system, which can be used for load transport vehicles, such as trucks, trailers, coaches and other road vehicles. However, the principles of the invention may be adapted for use with any wheeled vehicle, including tracked vehicles.

BACKGROUND OF THE INVENTION

Suspension systems incorporating air bags have previously been proposed. Air bag suspensions have been used on trucks, trailers, buses, coaches and the like for many years, and they generally provide an improved ride on highway surfaces, particularly relatively smooth highway surfaces.

When used on multi-axle vehicles, or when multiple air bags are used in conjunction with single axles on vehicles, it has previously been proposed to provide air bags on each side of the vehicle with the air bags connected by a tube or other connector of relatively small cross sectional area which restricts the flow of air between the tubes to a relatively low flow rate. The tube enables the air bags to be inflated relatively equally to provide an even height for the suspension of the vehicle above the ground.

Previously proposed air bag systems, however, have been shown to experience difficulty in providing adequate vehicle suspension when the vehicle is driven over rough terrain, particularly when such suspension systems have been used in conjunction with multi-wheeled, multi-axle vehicles. For example, for a coach having a multi-axle, rear suspension system, passing over a kerb, raised road section or the like, movement of the forward set of wheels over the impediment causes a consequent movement of the rear wheels lifting the rear wheels off the ground surface. Naturally, if drive is provided to the rear wheels of the dual rear axle suspension system, the vehicle can be stranded. A similar problem can arise with trucks or other vehicles with lazy axles when travelling over uneven roads, or when traversing relatively rough terrain. This may occur, for example, with farm related vehicles such as in attempting to load livestock or handling relatively large quantities of hay, straw, farming equipment, earthmoving equipment or the like.

With previously proposed air bag suspension systems, the air bags are generally supplied with air from an air tank using a relatively small diameter, low flow rate air tube connecting the tank to the air bags. This whole purpose of the connecting tube is to enable the air bags to be inflated and deflated, to vary the height of the vehicle above the ground depending on load conditions. The low flow rate air tubes are not designed or constructed to transfer air between air bags in response to sudden changes in pressure within the air bags and they do not quickly equalise the pressure within and between the air bags. This can cause difficulties, particularly with air bag suspension systems used in multi-axle vehicles, where it can be difficult to drive onto a ramp or the like as the valve, which is set to control the vehicle height, will react to the relative movement of one axle to thereby cause air to flow into the air bags thus causing one set of wheels to be lifted off the ramp. If that set of wheels is the set of driving wheels, further progress along the ramp may be prevented.

Another difficulty encountered with previously known air bag suspension systems is known as "tramp". When a multi-axle vehicle encounters a rough or uneven road surface, such as a railway crossing, a cattle grid or the like, the vehicle suspension is caused to oscillate (tramp) for a substantial period of time. Such oscillation may cause damage to the road's surface as well as unduly stress a fully loaded vehicle.

Attempts have been made to overcome known difficulties using air bags for vehicle suspension systems. Australian Patent No 567664 discloses an air bag suspension whereby an air tank is mounted in the vehicle chassis directly above the air bags, and short, large diameter air ducts connect each air bag to the air tank. This system has as its aim to maintain the air pressure in each air bag relatively constant irrespective of the position of the vehicle axle to thereby reduce excessive vehicle body movement. The specification also discloses the elimination of restricting flow air lines connecting the air bags to the air tank. Each side of the vehicle has its own air tank connected to the air bags on that side of the vehicle, with the air tanks optionally being connected.

However, this proposal does not solve the problems referred to above as, when a vehicle axle moves upwardly due to an irregularity in a road surface, air in the air bag and the air tank is compressed. When the irregularity in the road surface has been passed, the pressure in the air tank and air bag would force down the axle with great speed thereby forcing the vehicle tyre onto the road surface with a great impact. Because of the resilience of the vehicle pneumatic tyre, the rebound would be sufficient to again compress air in the air bag and air tank, thereby commencing a cycle of tramping. Shock absorbers or dampers are thereby required in such a system to counteract the effects of the tramping. Such shock absorbers or dampers add to the vehicle suspension costs and provide further stress points in the vehicle suspension.

Australian Patent Application No 69220/87 proposes the damping of shock loads on the suspension system by providing a secondary air tank mounted within the primary air tank and communicating through a restrictive opening. The secondary air tank and restrictive opening combine to assist in the dampening of shock loads on the suspension. However, with the speed of operation, the large volume of air in the air tank and the large size of openings between the air bags to the air tank means that no effective dampening of tramping occurs and the system is unable to cope with uneven loads and uneven terrain.

U.S. Pat. No. 3,063,732 discloses a vehicle suspension system incorporating both leaf and air spring assemblies in combination. The specification discloses the use of air bags on a dual axle suspension with front and rear air bags connected by a hollow sub-frame to serve as pneumatic reservoirs. The system is also provided with height control valves on each side of the suspension so that the air bags on each side are independently inflated in accordance with load conditions. The air suspension is used in conjunction with leaf springs on each end of each axle. However, this suspension system does not provide means for controlling tramp or otherwise damping suspension oscillations. Further, the ride height on both sides of the vehicle need to be adjusted to change the level travel height for any given load.

BRIEF DESCRIPTION OF THE INVENTION

According to one aspect of the present invention there is provided an air suspension system for multiple axles of a multi-axle vehicle, comprising an air bag system including at least one air bag operatively associated with vehicle wheels on selected axle sets to control relative movement between each of the selected wheels and a supporting frame structure of the vehicle, an air-flow arrangement to control the flow of air at least into each air bag, pressurising arrangement to maintain a selected, predetermined pressure in the air bag system when the vehicle is at rest, the pressurising arrangement including a valve to admit pressurised air to or exhaust air from the air bag system to maintain a predetermined vehicle height, wherein the valve is actuated by a link associated with a rocker member connected to spaced axles of the vehicle.

In one embodiment of the invention, the link is connected to the rocker member approximately mid-way between the connections of the rocker member to the respective spaced axles. Preferably, relative movement in one direction between the point of connection of the link to the rocker member and the vehicle supporting frame structure actuates the valve to admit pressurised air to the air bag system.

In one arrangement where the vehicle has three or more axle and wheel sets, two valves are used to maintain a predetermined vehicle height, each valve being actuated by separate links extending from points along rocker members mounted between adjacent axle sets.

In a preferred arrangement, the selected predetermined pressure is selectively variable to vary the vehicle height subject to load on the vehicle supporting frame structure.

The pressurising arrangement may also include a source of pressurised air, a low flow-rate air connection between the source of pressurised air and the air bag system, with the or each valve being connected to the low flow-rate air connection. With this arrangement, the pressurising arrangement is substantially unresponsive to valve actuation caused by relative movement of the rocker member and the supporting frame structure of the vehicle during vehicle operation when it is not at rest.

In one form, the rocker member comprises an elongated element mounted substantially longitudinally relative to the supporting frame structure of the vehicle, the element having attachment means at or adjacent each end for mounting the respective end portions thereof to respective spaced axle sets.

In one preferred system according to the invention, the air suspension system includes a high flow-rate air tube on each side of the vehicle connected to air bags on each side that are associated with adjacent axle and wheel sets. The system further includes air flow controlling means between the respective air bags and the associated high flow-rate air tube which regulates the flow of air from the high flow-rate air tube into the air bags generally in proportion to the air flow rate to thereby control the rate of air pressure build-up in the air bags when air flows from the high flow-rate air tube into the air bag, the high flow-rate air tube forming a manifold to which air is passed in a manner that is substantially un-regulated by the air-flow controlling means when air pressure in the air bag increases above that in the manifold.

The high flow rate air tubes associated with each opposed air bag are interconnected by a low flow rate connection to restrict flow of air between the high flow rate air tubes. Air is able to flow to and from the air bags to the manifold as a result of a sudden pressure increase in a respective air bag resulting, for example, from a vehicle wheel encountering a bump in a road surface. Such sudden pressure increase, however, is not passed from one manifold to the other due to the low flow rate connection restricting air flow between manifolds. Further, because the valve link is subject to movement only when the centre of the rocker member moves relative to the vehicle support frame structure, and the valve is connected to the source of pressurised air via a low flow-rate air tube, the selected, predetermined pressure in the air bag system is substantially unchanged.

Preferably, the air flow controlling means comprises a reduced diameter connection at one end, or each end, of the manifold. In a particular form, the air flow controlling means comprises the end wall of the manifold defining a shoulder between the manifold wall and the connection to the respective air bag. Such a shoulder acts to regulate the flow of air entering the connection from the manifold. It is believed that the regulation is as a result of turbulence developed, and the turbulence is proportional to the flow rate of air into the respective connection such that the regulation is proportional to the pressure difference between that of the air bag to which air is flowing and the manifold. Such regulation enables the system of the invention to react appropriately to road surface irregularities at any given vehicle speed. It is found that the rate of increase in pressure in one air bag and the transference of air from that air bag to the manifold and thus to the other air bag together with the controlled rate of flow of the air to the other air bag stabilises the rate of inflation of the other air bag to either totally obviate tramp or to substantially minimise rebound. Still further, it is found that the controlled rate of transference of air from the manifold to an air bag avoids development of suspension harmonic vibrations and/or oscillations which can give rise to unstable vehicle operation.

In one form of the invention, the pressurising means admits pressurised air from a tank, an air pump or the like, to the air bag system, and exhausts air from the air bag system through a restricted outlet, or low flow-rate air tube, to maintain the selected, predetermined vehicle height. As indicated, the pressurising means is unresponsive to sudden pressure changes in the air bag system during vehicle operation, and is used primarily to control and adjust the height of the vehicle within predetermined limits for any given load.

It will be understood that, in its preferred forms, the or each height valve is actuated by the link connected to the rocker member extending between adjacent axle sets of a multi-axle set of the vehicle. The link is connected to the rocker member at a point approximately mid way along the length of the rocker member whereby only relative movement between the midway connection point and the vehicle supporting frame structure causes actuation of the valve. This means that normal movement of the suspension during vehicle operation will generally not result in operation of the height valve.

The air suspension system of the present invention is adapted to be installed in existing vehicles as well as being incorporated into vehicles during manufacture. For incorporation into existing vehicles, an air suspension kit is provided comprising the necessary number of air bags, the appropriate high flow rate air tubes to connect to the respective air bags, the connectors to connect the high flow rate air tubes to the air bags, and system pressurising means incorporating an air tank or the like and a height control valve. The height control valve is connected to the high flow rate air tubes by a low flow rate connection so that changes in air pressure in the manifolds is not transferred between the manifolds.

DESCRIPTION OF DRAWINGS

In order that the invention may be fully understood embodiments thereof will now be described with reference to the accompanying drawings wherein.

DESCRIPTION OF PREFERRED EMBODIMENTS

Figure 1:
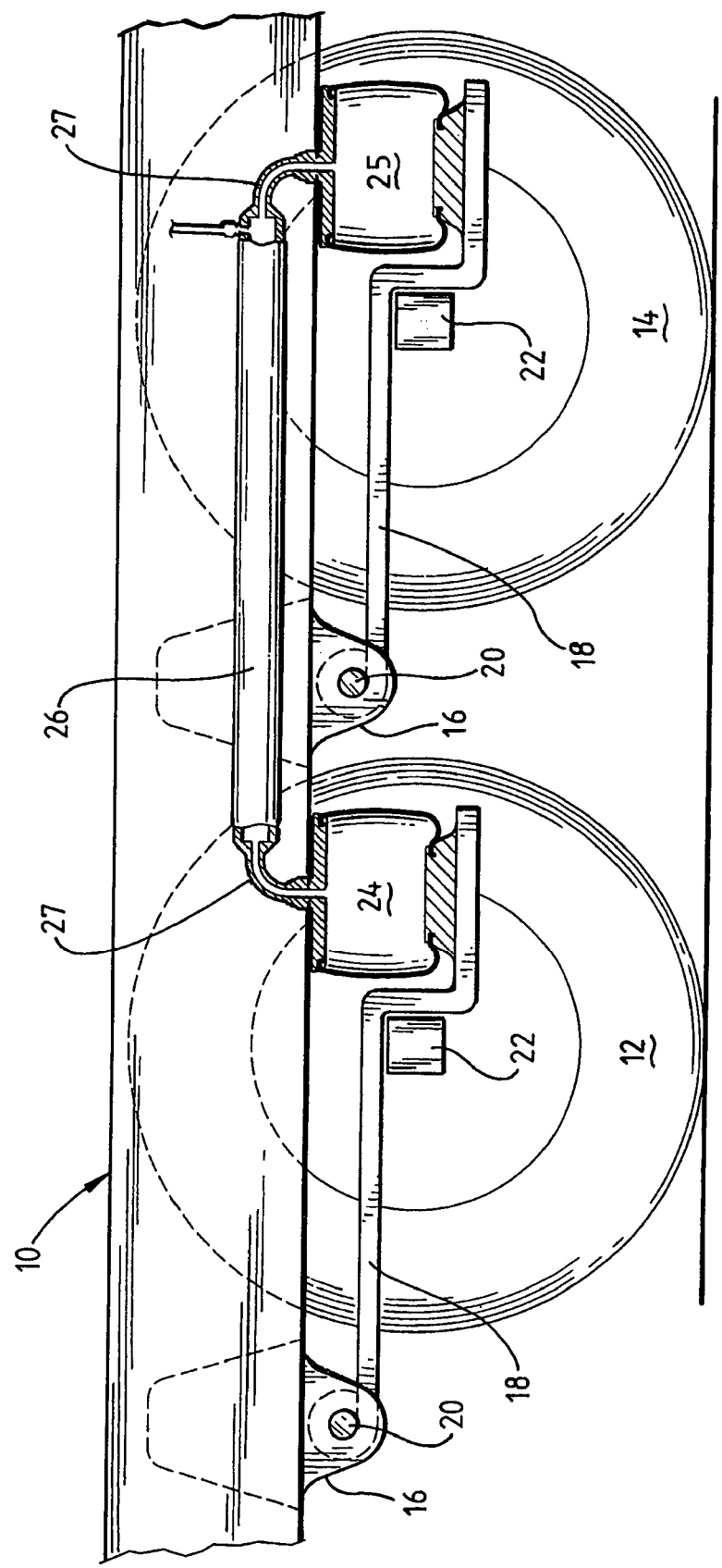
FIG. 1 is a schematic side view of a vehicle structure fitted with an air suspension system in accordance with a first embodiment of the invention.

Referring to the drawings, FIG. 1 shows one embodiment of the present invention for use with a vehicle having a pair of adjacent axles 22 mounting front and rear wheels 12 and 14. The vehicle incorporates a chassis member 10 on each side of the vehicle carrying a suspension mounting 16 for the front and rear axle and wheel sets. A trailing suspension arm 18 is mounted to each mounting bracket 16 by respective pivot pins 20. The axle 22 of each wheel set is mounted to the opposed suspension arms 18. Each suspension arm 18 is Z-shaped and engages over the respective axle 22 to form a mounting for respective front and rear air bags 24 and 25 which engage between the suspension arm 18 and the chassis 10. The nature and operation of air bags in vehicle suspensions is well known and will not be described in further detail.

In this embodiment, a high flow rate air tube 26 extends between the respective front and rear air bags 24 and 25 and is connected thereto by connectors 27. The high flow rate air tubes 26 on each side of the vehicle enable air to be transferred between the respective front and rear air bags in the event that the front and rear wheels 12 and 14 move upwardly or downwardly with respect to the chassis 10. Thus, if the front wheel 12 moves upwardly relative to the chassis 10, through the tire encountering a bump in a road surface, the air bag 24 is compressed increasing the pressure of air in that air bag. Air is then able to move from that air bag to the rear air bag 25 through the high flow rate air tube 26. Similarly, if the rear wheel 14 moves upwardly relative to the chassis 10 increasing the pressure in the rear air bag 25, air moves through the high flow rate air tube 26 into the front air bag 24.

This movement of air between the respective front and rear air bags is independent on each side of the vehicle, and enables all wheels of the vehicle structure to carry loads substantially equally, even when wheels are moving upwardly and downwardly relative to the chassis due to road irregularities and the like. If either or both of the front and rear wheel pairs 12 and 14 are driven wheels, the air bag system of this embodiment ensures that the appropriate downward pressure on the suspension arms 18, and thus the axles 22, enable the wheel sets 12 and 14 to have appropriate traction on the ground surface. In this way, it is possible for both wheel sets 12 and 14 to retain positive contact with the ground surface. The high flow rate air tube 26 is capable of transferring a relatively large volume of air relatively quickly between the respective front and rear air bags 24 and 25, thereby decreasing load on the vehicle suspension system, including vehicle shock absorbers, if fitted.

As indicated, the passage of air through the high flow rate air tube 26 occurs in both directions, depending on which of the front and rear air bags 24 and 25 has the greater or lesser internal pressure resulting from relative movement of the vehicle wheels 12 and 14. The high flow rate air tube 26 is connected to the respective air bags by connectors 27 which, together with the high flow rate air tube 26, controls the rate of flow through the high flow rate air tube 26. In this embodiment, the diameter of the high flow rate air tube 26 is approximately 2 inches and the diameter of the connectors 27 is between one half inch and one and one half inches. These relative dimensions, however, will vary with different embodiments of the invention, different air bag structures and sizes and the number of air bags used in an air suspension system.

Figure 2:
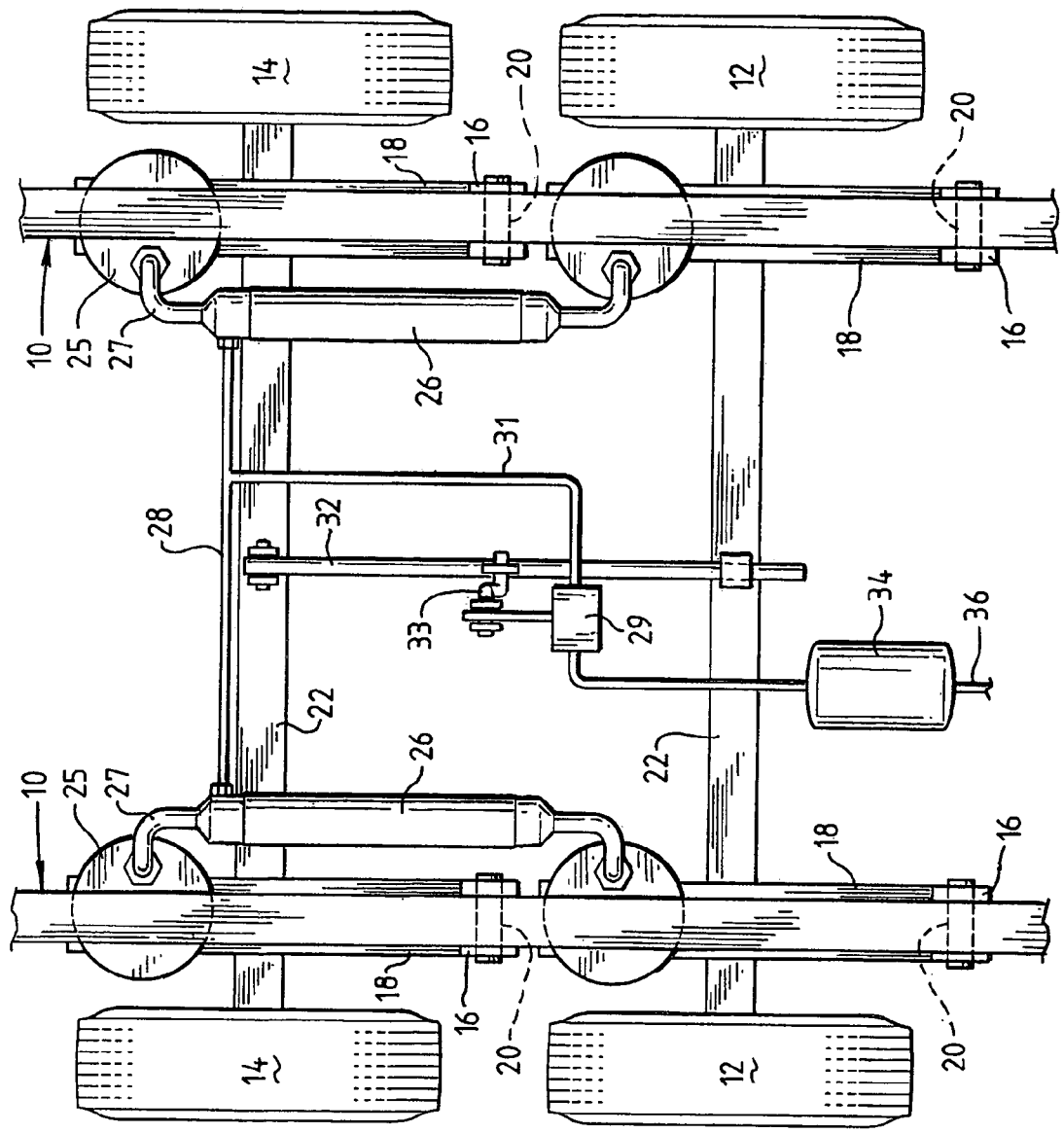
FIG. 2 is a plan view of the air bag suspension system embodiment of FIG. 1.

As shown in FIG. 2, the high flow rate air tubes 26 on each side of the vehicle are interconnected by a low flow rate air tube 28 which is connected via low flow rate tube 31 to a height valve 29 mounted on the vehicle chassis 10. A rocker member 32 extends between the front and rear axles 22, and a vertically extending link 33 is connected between the rocker member 32 and the height valve 29. With this arrangement, any change in height between the mid point of the rocker member, to which the link 33 is connected, and the height valve 29 results in movement of the link 33 to actuate the height valve. An air tank 34, supplied with air from an air pump (not shown) through the inlet tube 36 contains air under pressure for pressurising the air bags. Movement of the link 33 causes the height valve 29 to either admit air into the air bag system through the low flow rate line 31 and low flow rate interconnecting tube 28, or to exhaust air from the system. Thus, if the height between the mid point of the rocker member 32 and the valve 29 decreases, as a result of an increase in load on the vehicle chassis 10, the valve actuates to increase the pressure in the air bags 24 to restore the height to the predetermined set position. The pressure in the air bags 24 and 25 is, therefore, adjusted in accordance with the vehicle mass and load. However, because the low flow rate air tube 28 and air supply tube 31 conveys air at a low flow rate, minimal transference of air occurs between the high flow rate air tubes 26 on opposite sides of the vehicle due to relative movement of the vehicle wheels and chassis during operation of the vehicle. Further, by placing the connection of the link 33 to the mid point of the rocker member 32, up and down movements of the front and rear wheel sets over a road bump or the like does not effect the relative position of the mid point link connection sufficiently to cause substantial or effective actuation of the valve 29.

Figure 3:
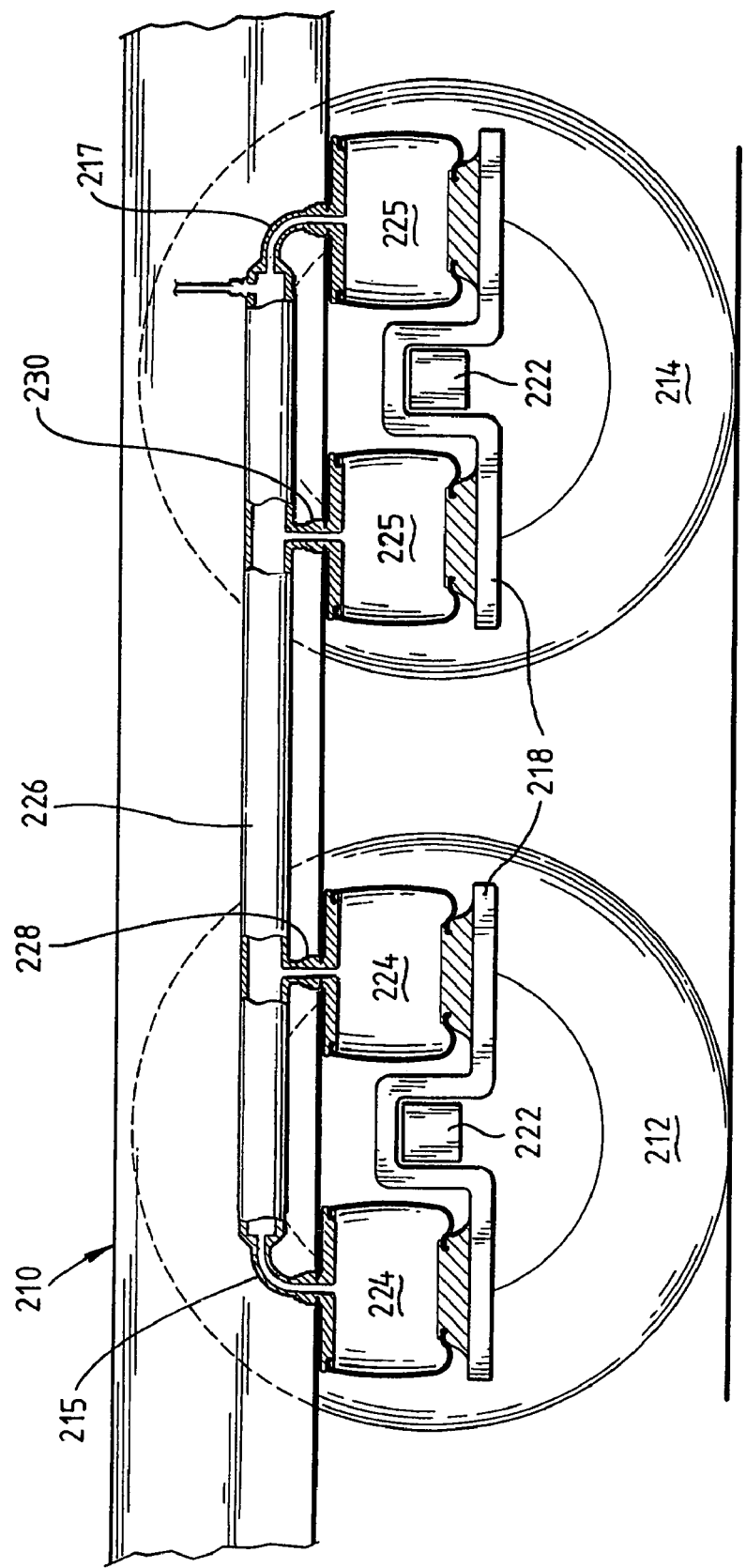
FIG. 3 is a schematic side view of a second embodiment of the invention.

Referring to FIG. 3, the arrangement shown is similar to that of FIGS. 1 and 2 except that each axle 222 is associated with two air bags 224, 225. With this arrangement, each of the front and rear air bags 224 and 225 are interconnected by a high flow rate air tube 226, with the end bags being connected to the tube 226 by connectors 215 and 217 whilst the intermediate bags of each pair 224, 225 are connected to the tube by connectors 228 and 230, respectively. It will be understood that relative vertical movement of the front and rear wheel sets 212 and 214 results in a transference of air from one of the pairs of air bags 224, 225 to the other, but only half the air transferred passes through the section of high flow rate air tubes 226 interconnecting those air bags of each pair. In this embodiment, a suspension saddle 218 connects the respective air bags with the front and rear axles 222. Air fittings 215 and 217 are used to connect the high flow rate air tube 226 to the respective air bags 224, 225. The air fittings 215, 217 act to regulate the flow of air to prevent uncontrolled air flow between the air bags, to obviate resonant or harmonic pressure transference through the system.

The air bags shown in this embodiment are pressurised in a manner similar to that shown in the previous embodiment. Thus, a rocker member (not shown) extends between the front and rear axles 222, and a vertically extending link (not shown) is connected between the rocker member and the height valve, as more particularly shown in FIG. 4.

Figure 4:
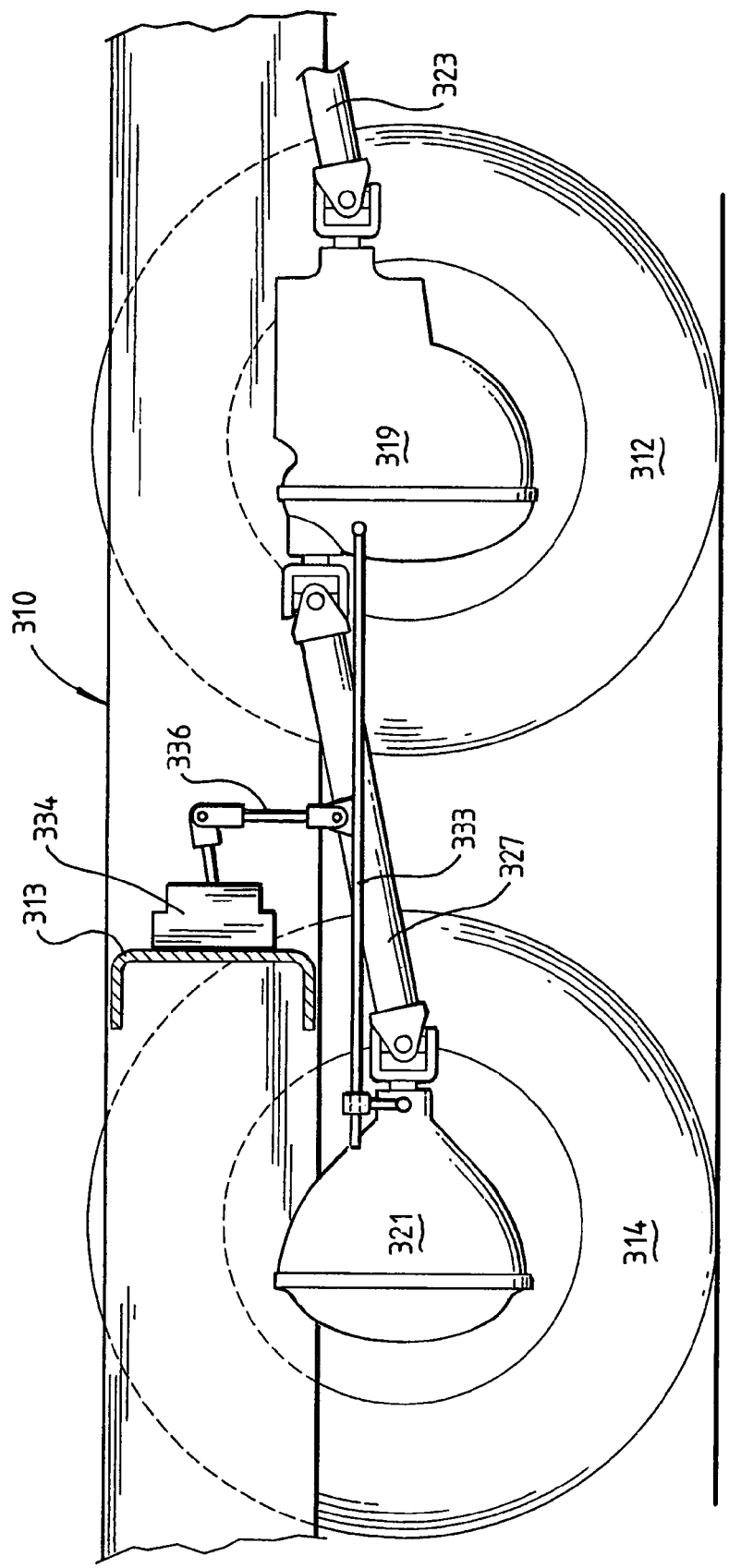
FIG. 4 is a side view illustrating a height valve for use with embodiments of the invention.

Referring to FIG. 4, the vehicle chassis 310 is carried by front and rear wheel sets 312, 314 utilising an air bag system according to either of the previous embodiments. In the arrangement illustrated, the wheels 312, 314 are driven through differentials 319, 321 with drive shafts 323 and 327.

A height valve rocker member 333 is connected between the differential 319 and 321. The height valve 334 is carried on cross member 313 and serves to automatically control the inflation of both front and rear air bag systems as previously described. The valve 334 is actuated by a link 336 which is connected substantially mid point of a rocker member 333 mounted between the differentials 319 and 321. With this arrangement, if the wheels 312, 314 pass along a sloping ramp in a reversing mode, rear wheels 314 lift but front wheels 314 lower. Therefore, there is little or no movement of the centre of the rocker member 333 and the link 336 attached thereto. The valve may be arranged so that minimal movement of the mid point of the rocker member 333 may cause minimal movement of the link 336 but insufficiently to actuate the valve 334. Otherwise, air bags may be inflated or deflated inappropriately as a result of movement of a vehicle on or off a ramp or the like. By using the mid point between the axles of the front and rear wheel sets 312 and 314, the valve 334 is not actuated inappropriately. However, if both differentials, 319, 321 move up and down in relative unison, the rocker member 333 will cause the valve 334 to be actuated as required so that air is either added to or removed from the air bag system.

It will be understood that the pressure within the air bag system may be adjusted to take account of a load on the vehicle. Thus, with a "no load" condition, the pressure may be reduced to lower vehicle height. Conversely, when the vehicle is fully loaded, the pressure will be set to ensure a proper ride height for the vehicle.

Figure 5:
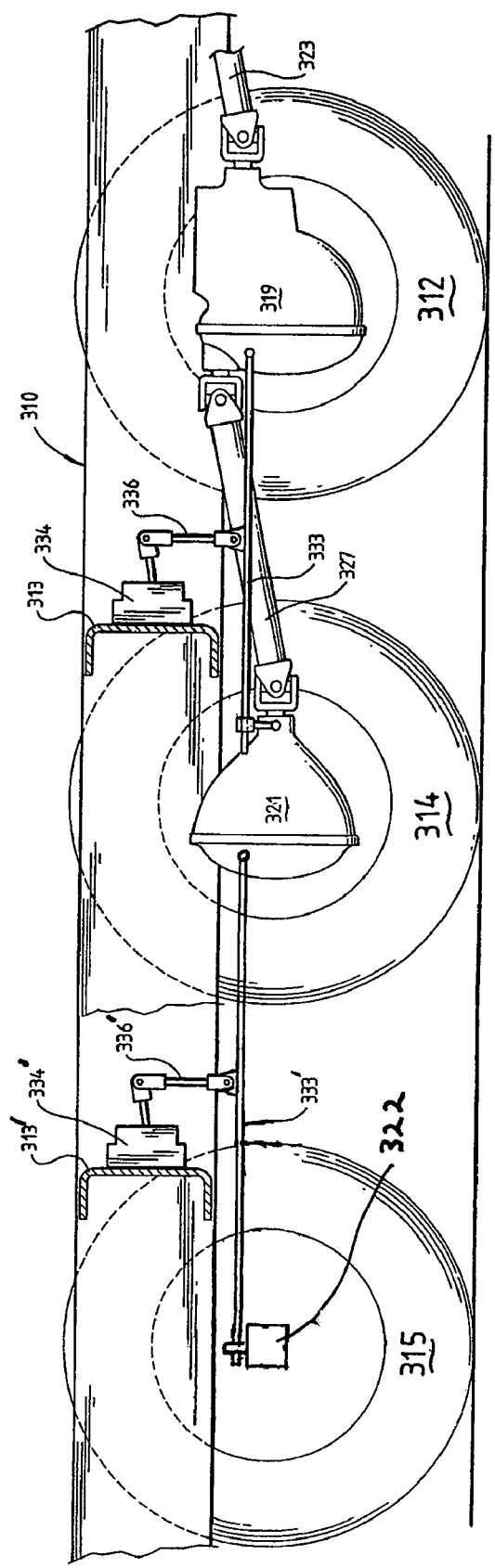
FIG. 5 is a view similar to FIG. 4, but illustrating an embodiment of the invention applied to a tri-axle vehicle structure.

FIG. 5 shows a further embodiment wherein the vehicle chassis 310 is carried on a tri-axle wheel set having driven front and middle wheel sets 312, 314, and a rear wheel set 315, all of which use an air bag system according to the previous embodiment. In the arrangement illustrated, as in FIG. 4, the wheels 312, 314 are driven through differentials 319, 321 with drive shafts 323 and 327. The wheel set 315 is carried on axle 322 in a manner similar to that shown in FIG. 1.

A height valve rocker member 333 is connected between the differential 319 and 321 and a second rocker member 333' is connected between the differential 321 and the axle 322. A height valve 334 is carried on first cross member 313 while a second height valve 334' is mounted on the second cross member 313', both valves operating in parallel to automatically control the inflation of three pairs of air bags (not shown) to establish the desired ride height. As in FIG. 4, the valve 334 is actuated by a link 336 which is connected substantially mid point of the rocker member 333 mounted between the differentials 319 and 321. The second, rearward valve 334' is connected to the mid-point of the rocker member 333' by the link 336'.

Figure 6:
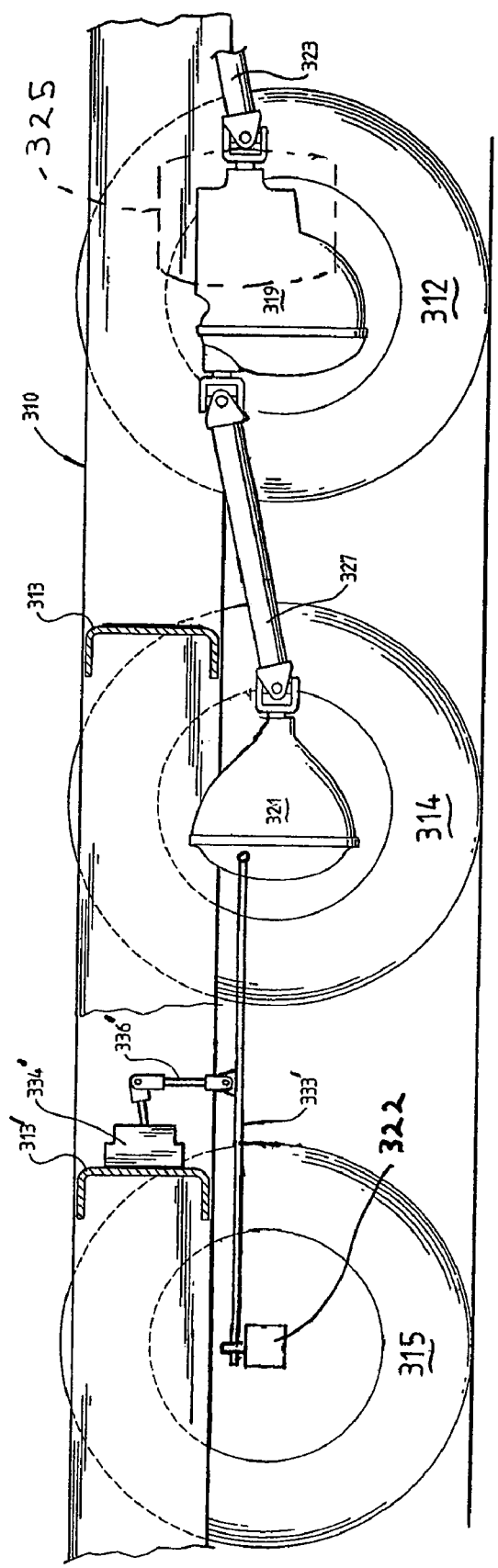
FIG. 6 is a similar view to that of FIG. 5 showing a further embodiment of the invention.

In a further form of the invention shown in FIG. 6, only a single valve 334' is provided for a tri-axle suspension arrangement, and the rocker member 333' extends between the rear axles 322 and 321. With this arrangement, a separate air bag 325, shown in dashed outline, is manually inflatable to lift the front axle 312 from the ground when the vehicle chassis 310 is lightly loaded, or unloaded so that the chassis is carried by the rear wheel sets only.

Figure 7:
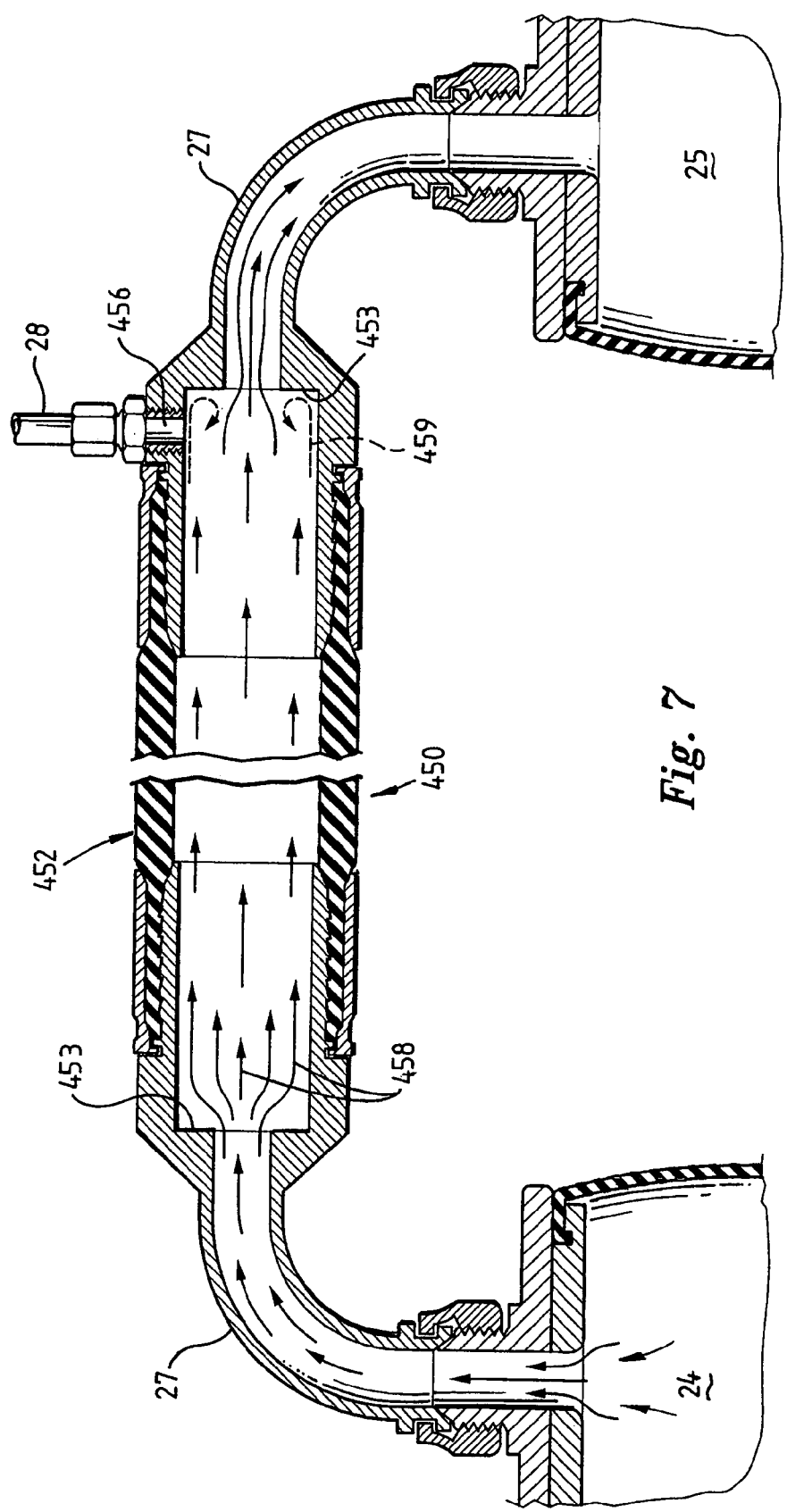
FIG. 7 is a schematic longitudinal sectional view of a high flow rate air tube for use with embodiments of the invention.

Referring to FIG. 7, there is illustrated a high flow rate air tube 452 which is adapted to be used with any of the embodiments of the invention but which will be described with reference to its use in the embodiment shown in FIGS. 1 and 2.

The high flow rate air tube 452 of this embodiment is formed from a relatively flexible, pressure hose, such as a hydraulic hose. In the embodiment illustrated, the hydraulic hose is of two inches diameter and is preformed with crimped ends joined to the smaller diameter connector tubes 27 which connect the high flow rate air tube 452 to the respective front and rear air bags 24 and 25 on each side of the vehicle. The connector tubes may have a diameter of between about 0.25 and 0.8 times the diameter of the high flow rate air tube. A hydraulic hose is a preferred form of high flow rate air tube as it is designed and constructed to resist collapsing if the outside pressure exceeds the inside pressure.

The hydraulic hose, being flexible, is also able to be located relative to a vehicle chassis 10 so as to be positioned over and around structural members, suspension arms and the like. The relatively large diameter, high flow rate air tube 452 constitutes a manifold 450 with the smaller diameter end connectors 27 through which air is passed from one or other of the air bags 24, 25 during vehicle operation. The change in diameter between the large diameter manifold 450 and the smaller diameter connections 27 forms a shoulder 453 at each end of the manifold 450. Air flow through the manifold, indicated by flow lines 458, becomes turbulent where it strikes a shoulder 453 and the air is forced to flow back on itself as it abuts the shoulder 453. This air flow back results in a control or regulation of the air flow from the manifold 450 into the end connector 27 and the air bag 25, when air is flowing in the direction as shown.

The air flow through the manifold 450 is generally proportional to the pressure difference between the air bags 24 and 25, such as that caused by the front vehicle wheels 12 moving upwardly relative to the chassis 10 as a result of a bump in the road surface. The flow rate through the manifold 450 and out into the air bag 25 is regulated by the back flow of air impeding the flow of air out of the manifold 450. Such impeding of the flow of air flowing into the air bag 25 prevents rapid transferral of air from one air bag to the other and therefore provides a damping effect to significantly reduce or eliminate tramping by reducing the rate of rise of pressure in air bag 25. The control or regulation also prevents over transfer of air between air bags that could otherwise result in the air pressure in the air bag to which air is transferred rising above that of the other air bag. Such over transfer can give rise to oscillations, whereby air moves backward and forward between the air bags through the high flow air tube which sometimes resonates causing uncontrolled vehicle pitching.

It will be understood that when the air pressure in the air bag 25 becomes greater than that in the air bag 24, air flows in the reverse direction to that shown in FIG. 7. It will also be understood that the back flow of air caused by the shoulder 453 when air flows out of the manifold 450 in one direction or the other provides a variable regulation of the air flow in accordance with the air flow rate through the manifold. The regulation enables the system of the invention to react appropriately to road surface irregularities at any given vehicle speed. The rate of increase in pressure in one air bag and the rate of transference of air from that air bag to the manifold and thus to the other air bag together with the controlled rate of flow of the air to the other air bag stabilises the rate of inflation of the other air bag to either totally obviate tramp or to substantially minimise rebound.

A port 456 may be formed at one or other end of the high flow rate air tube 452 to facilitate connection of the tube 452 with the low flow rate air tube 28 providing pressurised air to the system, as shown in FIG. 2. Alternatively, such a port may be positioned approximately centrally along the length of the flexible high flow rate tube 452.

With the present invention, it may be possible to use an air bag suspension system without the use of normal dampers or shock absorbers. Alternatively, reduced capacity dampers or shock absorbers may be used thus significantly reducing costs of suspension component. The damping effect resulting from use of the present invention dramatically reduces suspension oscillation or resonance. Therefore, suspension components, including springs, mounting points and the like are subjected to less stress than would otherwise occur over the life of a vehicle.

The invention claimed is:

1. An air suspension system for a vehicle having a supporting frame structure and first and second wheels on at least one side of the vehicle, the air suspension system comprising:
   a) first and second air bags operatively associated with the first and second wheels, respectively, to control relative movement between the first and second wheels and the supporting frame structure;
   b) a manifold including opposing first and second end walls defining a space thereinbetween, the first end wall having a first fluid passageway formed therethrough and the second end wall having a second fluid passageway formed therethrough, wherein a first inlet of the first fluid passageway is smaller in diameter than a diameter of the first end wall and a second inlet of the second fluid passageway is smaller in diameter than a diameter of the second end wall, thereby forming a shoulder at each of the first and second end walls of the manifold, wherein the first and second inlets do not extend into the defined space, the first and second fluid passageways in fluid communication with the first and second air bags, respectively;
   c) an air flow control structure located between the manifold and each of the first and second air bags, at least a portion of the air flow control structure defined by the shoulders, the air flow control structure configured to cause a restriction on the air flow from the manifold into the first air bag, wherein the amount of the restriction on the air flow varies proportionately to the rate of air flow from the manifold into the first air bag and the air flow control structure further configured to regulate the air flow from the manifold into the first air bag such that an increase in a pressure differential between the manifold and the first air bag results in an increase in the flow rate from the manifold into the first air bag that occurs at a lower rate than the rate of the increase in the pressure differential, thereby controlling the rate of air pressure build-up in the first air bag; and
   d) a pressurizing arrangement including a height valve for admitting pressurized air into or exhausting air from the manifold through a low flow-rate air tube, the height valve actuated by a link connected to a rocker member extending between the first wheel and the second wheel, wherein the link is connected to the rocker member at generally a mid point of the rocker member such that any change in height between the mid point and the height valve results in movement of the link to actuate the height valve to either admit pressurized air into or exhaust air from the manifold, wherein the connection between the low flow-rate air tube and the manifold defines a third inlet into the manifold located between the first end wall and the second end wall of the manifold, the third inlet being smaller in diameter than the diameters of the inlets of the first and second fluid passageways.

2. An air suspension system according to claim 1, wherein air is forced into the manifold from the second air bag.

3. An air suspension system according to claim 1, wherein the manifold defines a length between the first end wall and the second end wall, the manifold defining a longitudinal axis along the length, wherein at least a portion of each of the first and second fluid passageways extends in a direction parallel to the longitudinal axis of the manifold.

4. An air suspension system according to claim 3, wherein at least a portion of each of the first and second fluid passageways is centered along the longitudinal axis of the manifold.

5. An air suspension system according to claim 1, wherein the manifold defines a tubular construction.

6. An air suspension system according to claim 1, wherein the manifold defines a diameter of approximately 2 inches at the first and second end walls and the diameters of the inlets of the first and second fluid passageways are between one half inch and one and one half inches.

7. An air suspension system according to claim 1 wherein said rocker member comprises an elongated element mounted substantially longitudinally relative to the supporting frame structure of the vehicle, the element having attachment means at or adjacent each end for mounting the respective end portions thereof to respective spaced axles that include the first and second wheels.

8. An air suspension system according to claim 7 wherein the element includes a bracket substantially mid-way between the attachment means and to which the valve actuating link is attached.

* * * * *